: 3,474,828
Patented Oct. 28, 1969

3,474,828
FLUID CONTROL SWITCHING ARRANGEMENTS
Kenneth John Wheeler and Edward John Ward, Burgess Hill, England, assignors to Norcon (Norris) Limited, Burgess Hill, Sussex, England, a British company
Filed May 31, 1967, Ser. No. 642,364
Claims priority, application Great Britain, May 31, 1966, 24,070/66
Int. Cl. F17d 3/00; F15c 3/02; F16k 11/07
U.S. Cl. 137—625.6     6 Claims

ABSTRACT OF THE DISCLOSURE

A fluid control switching arrangement for hydraulic or pneumatic systems, in which a step-up relay for controlling a high-pressure fluid flow by a low-pressure input signal is formed by a main spool valve having an operating connection to the high-pressure fluid source via a throttling orifice, so that pressure can be built up to operate the spool valve when a control valve operated by a bellows connected to a low-pressure input is closed. The arrangement may be constructed for monostable or bistable operation.

---

The invention relates to fluid control switching arrangements of the type employed for controlling the flow of a fluid under pressure in a pneumatic or hydraulic system.

With the use of fluid logic devices in control systems, it is necessary to provide means whereby a low pressure pneumatic output signal in the order of 1 p.s.i. supplied by a fluid logic device can operate a control valve in a high pressure hydraulic or pneumatic control system employing pressures as high as 3000 p.s.i.

One object of the present invention is to provide a simple switching arrangement that is capable of reliable operation as an interface step-up relay in such systems.

The invention consists in a fluid control switching arrangement comprising a chamber having at least one high-pressure inlet, at least one exhaust outlet, and at least one output port, a main spool valve slideable in said chamber between a first position in which a high-pressure inlet is connected to an output port and a second position in which an output port is connected to an exhaust outlet, a connection via a throttling orifice between a high-pressure inlet and one end of said chamber to permit the build-up of pressure of high-pressure fluid to a value sufficient to drive said main spool valve from one of said positions to the other, and a control valve operated by a bellows connected to a low-pressure fluid inlet, said control valve being connected between said one end of said chamber and an exhaust outlet.

Figure 1:
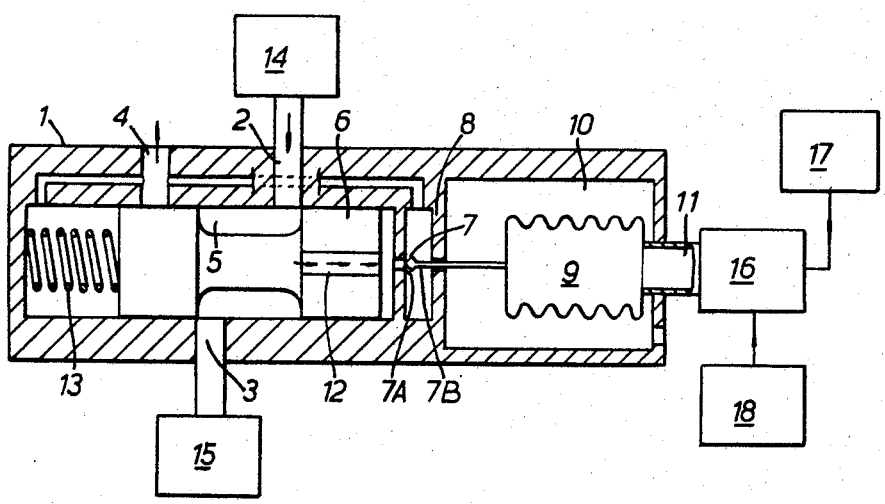
Figure 2:
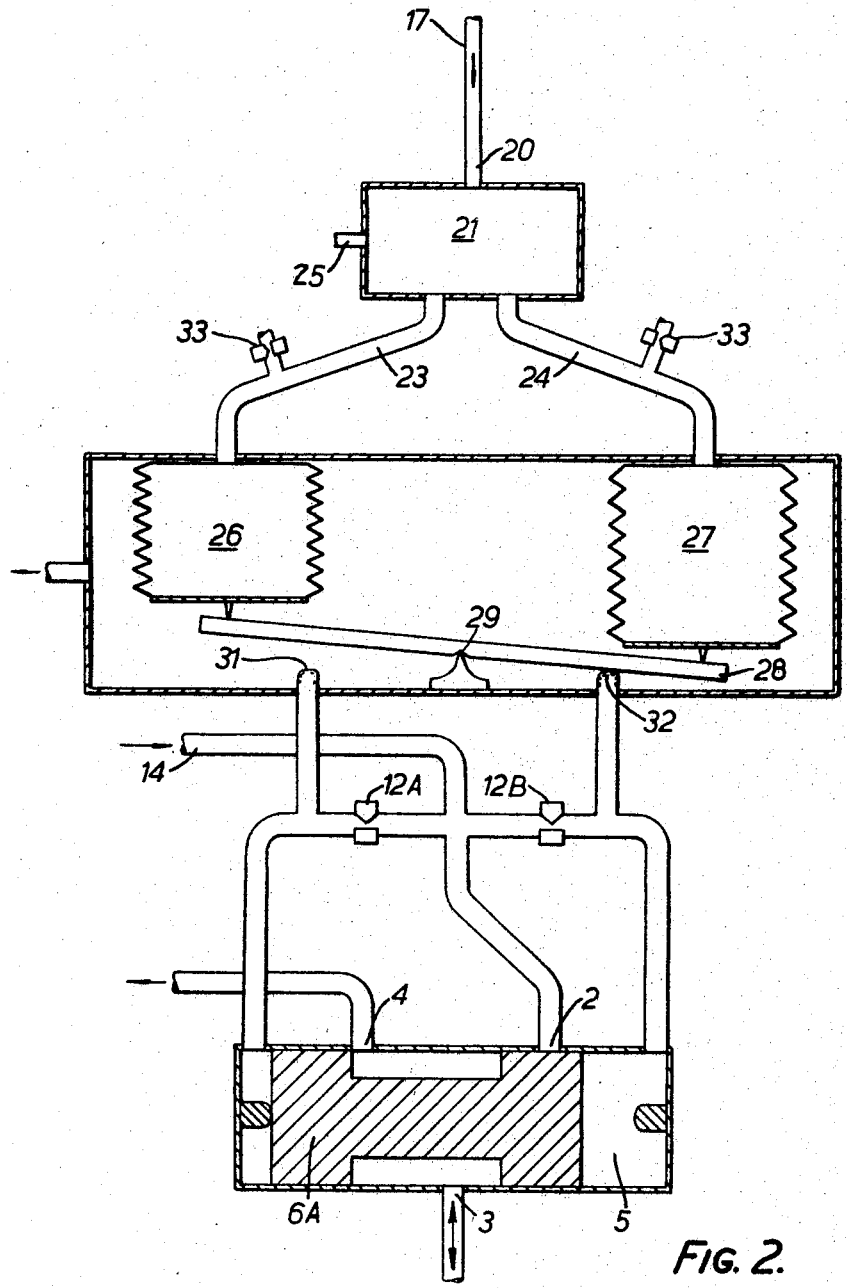

The invention will now be described with reference to the accompanying drawings, in which:

FIGURE 1 schematically illustrates an exemplary embodiment of a monostable step-up relay in accordance with the invention; and FIGURE 2 similarly depicts an exemplary bistable embodiment.

In FIGURE 1, the switching arrangement is formed in a housing 1, having a high-pressure inlet 2, an output port 3, and an exhaust outlet 4, all communicating with a chamber 5 in which there is a main spool valve 6. At one end of the chamber 5, there is a control valve 7 in the form of a needle-seating 7A and a co-operating needle 7B, the needle passing through a secondary seal 8 and being mounted on the end plate of a bellows 9 contained in an ancillary chamber 10. A low-pressure inlet 11 communicates with the interior of the bellows 9.

Small flats or grooves 12 are ground at opposite sides of the spool valve 6 to form a throttling orifice for the passage of high-pressure fluid from the inlet 2 to the end of the chamber 5, at which the control valve is provided, and when the control valve is open, an outlet for the high-pressure fluid is provided, communicating with the exhaust outlet 4. A return spring 13 is provided at the other end of the spool valve 6.

In operation, a source of high-pressure fluid 14 is connected to the inlet 2, a device 15 to be controlled is attached to the output port 3, and a control connection to the low-pressure inlet 11 is provided from an output of a fluid logic device 16, which switches the supply from a low-pressure fluid source 17 under the influence of a controlling pressure applied by an input device 18.

In this example, the device 15 to be controlled is a hydraulically operated digital jack, and the fluid logic unit operates with an air supply.

When there is no control pressure in the bellows 9, the needle valve 7 is open, so that there is no build-up of hydraulic pressure at the end of the spool 6, and the return spring 13 is able to push the spool 6 into a position where the output port to the jack 15 is connected to the high-pressure line 2. When the fluid logic device 16 produces a control pressure (0.25 p.s.i. min.) in the bellows 9, then the needle valve is closed, so that hydraulic pressure builds up behind the spool 6 to equal the hydraulic supply pressure, and the spool is forced against the return spring to connect the output port 3 to the exhaust line 4. Thus, the spool is operated by the supply of oil from the hydraulic pressure line to the first stage through a throttling orifice formed by grinding small flats on opposite sides of the main spool 6, thus forming channels through which a small quantity of oil is permitted to leak past the spool valve. This not only avoids the need to manufacture a separate fixed orifice, but also serves to increase reliability because the tendency of dirt to settle in the orifice and block it is reduced, since the spool is moved whenever the valve works.

The fact that the spool moves means that the length of the orifice varies, being at its longest when the return spring has extended, i.e. when the needle valve is open, and vice-versa. The flow of oil through the orifice decreases as the orifice length increases, so the greatest restriction occurs when there is to be least pressure behind the spool.

The second seal 8 on the first stage needle is required to enable monostable operation to be employed, as it serves to isolate the sensitive bellows from the exhaust flow through the control valve. If this is not provided, then it would be necessary to use a pair of bellows connected by a beam, as shown in the exemplary embodiment depicted in FIGURE 2.

In the exemplary embodiment of a bistable relay shown in FIGURE 2, the low-pressure pneumatic supply 17 is fed to a fluid logic device 21 via a supply inlet 20, and an output appears at the output line 23 or 24, the actual line being determined by the input signal applied to a control inlet 25 of a fluid logic monostable circuit shown for simplicity. It will be understood that other fluid logic devices may be employed, for example the device may be a bistable circuit having two control inlets.

The output lines 23 and 24 are respectively connected to bellows 26 and 27, which operate a flapper valve 28 pivoted at 29, so that the differential action of the bellows controls the opening and closing of flapper nozzles 31 and 32. The movement of the flapper valve is magnified in the drawing, for the sake of clarity.

A fixed orifice outlet 33 is provided in each of the output lines 23 and 24, to prevent the build-up of pressure when a bellows has been driven to its maximum extent, determined by the closing of the associated flapper nozzle.

A high-pressure supply 14 is fed to the supply inlet 2 of a chamber 5 containing a spool valve 6A and also provided with an output port 3 and an exhaust outlet 4. Branch lines from the main inlet 2 connect the high-pressure supply to each end of the spool valve 6A via separate throttling orifices 12A, 12B, the flapper nozzles 31 and 32 being connected to these branch lines after the throttling orifices.

In the position shown in the drawing, it is assumed that the fluid logic device 21 is providing an output signal to the line 24 to extend the bellows 27 so that the flapper nozzle 32 is closed, and the nozzle 31 is open, allowing high-pressure fluid to enter the exhaust chamber containing the bellows. The resulting drop in pressure at the left-hand end of the chamber 5 allows the spool 6A to move to the left under the influence of the pressure applied via the throttling orifice 12B, so closing the supply inlet 2 and connecting the output port 3 to the exhaust outlet 4.

It will be seen that if the input signal applied to the control inlet of the fluid logic device 21 causes the output signal to switch from the output line 24 to the output line 23, the bellows 26 will be extended to close the flapper nozzle 31 and open the nozzle 32, so causing the spool 6A to move over to the right-hand end stop and connect the supply inlet 2 to the output port 3.

The arrangement shown is particularly suitable for the control of digital actuators in machine tool arrangements, for example in the manner described in copending United States patent application, Ser. No. 635,442, filed May 2, 1966.

The switching arrangement described can be employed to provide amplification of the signal pressure with either a pneumatic/pneumatic or a pneumatic/hydraulic interface.

By constructing the spool valve together with the chamber containing the bellows and control valve as an integral unit, a very compact step-up relay assembly may be obtained, particularly in the monostable case, but a practical bistable embodiment of the invention has been constructed in which the overall dimensions are 2½" x 2" x 1".

What we claim as our invention and desire to secure by Letters Patent of the United States is:

1. A fluid control switching arrangement comprising a chamber having at least one high-pressure inlet, at least one exhaust outlet, and at least one output port, said chamber containing a main spool valve having two terminal lands defining a central annular groove, said main spool valve being slideable in said chamber between a first end position in which said high-pressure inlet is connected to said output port via said annular groove and a second end position in which said output port is connected to said exhaust outlet via said annular groove, the ends of said chamber being connected to said exhaust outlet by separate external passages one of which contains a control valve operated by a bellows connected via a bistable fluid logic device to a low-pressure fluid inlet, and wherein a connection is provided via a throttling orifice between said high-pressure inlet and the control valve end of said chamber to permit the build-up of pressure of high-pressure fluid to a valve sufficient to drive said main spool valve from said first position to said second position when said control valve is closed by the output of said fluid logic device.

2. A fluid control switching arrangement as claimed in claim 1, in which said throttling orifice is formed by at least one flat or groove along the side of said main spool valve.

3. A fluid control switching arrangement as claimed in claim 2, in which said control valve is a needle valve mounted at said one end of said chamber.

4. A fluid control switching arrangement as claimed in claim 1, in which a return spring is provided to return said main spool valve to said one end of said chamber when said control valve is opened, and said bellows are contained within an ancillary chamber isolated from said high-pressure fluid.

5. A fluid control switching arrangement as claimed in claim 1, in which said control valve is a flapper valve controlling two flapper nozzles, one at each end of said chamber, said flapper valve being controlled by two bellows connected to separate low-pressure fluid inlets.

6. A fluid control switching arrangement as claimed in claim 5, in which each of said low-pressure fluid inlets is connected to a separate output of a bistable fluid-logic device.

References Cited
UNITED STATES PATENTS

| | | | |
|---|---|---|---|
| 1,197,053 | 9/1916 | Nicholson et al. | 251—43 XR |
| 2,625,136 | 1/1953 | Moog | 137—625.61 |
| 2,655,939 | 10/1953 | Tauscher et al. | 137—625.63 |
| 3,030,928 | 4/1962 | Jaquith et al. | 137—625.61 XR |
| 2,984,218 | 5/1961 | Christianson | 137—625.62 XR |
| 3,044,480 | 7/1962 | Lee | 137—625.63 XR |

HENRY T. KLINKSIEK, Primary Examiner

U.S. Cl. X.R.
137—81.5